United States Patent
Takemura et al.

(10) Patent No.: US 9,426,656 B2
(45) Date of Patent: Aug. 23, 2016

(54) ON-VEHICLE DEVICE, COMMUNICATION METHOD, AND STORAGE MEDIUM

(71) Applicants: FUJITSU TEN LIMITED, Kobe-shi, Hyogo (JP); HONDA MOTOR CO., LTD., Tokyo (JP)

(72) Inventors: Ryota Takemura, Kobe (JP); Takanori Fujiwara, Kobe (JP); Atsuyuki Suzuki, Wako (JP); Junichi Hirose, Wako (JP)

(73) Assignees: FUJITSU TEN LIMITED, Kobe (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/425,227

(22) PCT Filed: Sep. 3, 2013

(86) PCT No.: PCT/JP2013/073708
§ 371 (c)(1),
(2) Date: Mar. 2, 2015

(87) PCT Pub. No.: WO2014/050459
PCT Pub. Date: Apr. 3, 2014

(65) Prior Publication Data
US 2015/0223064 A1     Aug. 6, 2015

(30) Foreign Application Priority Data

Sep. 25, 2012   (JP) ................. 2012-211506

(51) Int. Cl.
*H04M 1/00*       (2006.01)
*H04M 1/66*       (2006.01)
(Continued)

(52) U.S. Cl.
CPC ............. *H04W 12/06* (2013.01); *B60K 35/00* (2013.01); *H04L 67/125* (2013.01); *H04W 4/046* (2013.01); *H04W 12/10* (2013.01); *H04L 67/12* (2013.01); *H04M 1/6083* (2013.01); *H04M 1/72577* (2013.01)

(58) Field of Classification Search
CPC . H04W 12/12; H04W 12/06; H04M 1/72519; H04M 1/72522
USPC ............................ 455/410–411, 550.1, 556.1
See application file for complete search history.

(56) References Cited

U.S. PATENT DOCUMENTS

| | | | |
|---|---|---|---|
| 2006/0050018 A1* | 3/2006 | Hutzel | B60K 35/00 345/60 |
| 2010/0037300 A1* | 2/2010 | Jin | G06F 9/542 726/4 |
| 2011/0096246 A1* | 4/2011 | Dunn | G09G 3/006 348/739 |

FOREIGN PATENT DOCUMENTS

| | | |
|---|---|---|
| JP | 2008-259043 A | 10/2008 |
| JP | 2009-035024 A | 2/2009 |

OTHER PUBLICATIONS

Dec. 3, 2013 International Search Report issued in International Patent Application No. PCT/JP2013/073708.

(Continued)

*Primary Examiner* — Olumide T Ajibade Akonai
*Assistant Examiner* — Matthew Genack
(74) *Attorney, Agent, or Firm* — Oliff PLC

(57) ABSTRACT

An on-vehicle device is configured to be able to communicate with a mobile device, and includes a reception unit, an interruption detection unit, a determination unit, and a display control unit. The reception unit receives image information transmitted from a particular mobile device which is a mobile device with which communication is established. The interruption detection unit detects that reception of the image information is interrupted. The determination unit determines whether or not the transmission device which transmits the image information is the particular mobile device, when the reception unit receives image information again after interruption of the reception is detected. The display control unit stops displaying the image information transmitted from the transmission device on a display device when the transmission device is determined not to be the particular mobile device.

11 Claims, 10 Drawing Sheets

(51) Int. Cl.
  *H04W 12/06* (2009.01)
  *B60K 35/00* (2006.01)
  *H04L 29/08* (2006.01)
  *H04W 4/04* (2009.01)
  *H04W 12/10* (2009.01)
  *H04M 1/60* (2006.01)
  *H04M 1/725* (2006.01)

(56) References Cited

OTHER PUBLICATIONS

Mar. 28, 2016 Office Action issued in Chinese Patent Application No. 2013800485839.

\* cited by examiner

NAVIGATION IMAGE NP

FIG.3
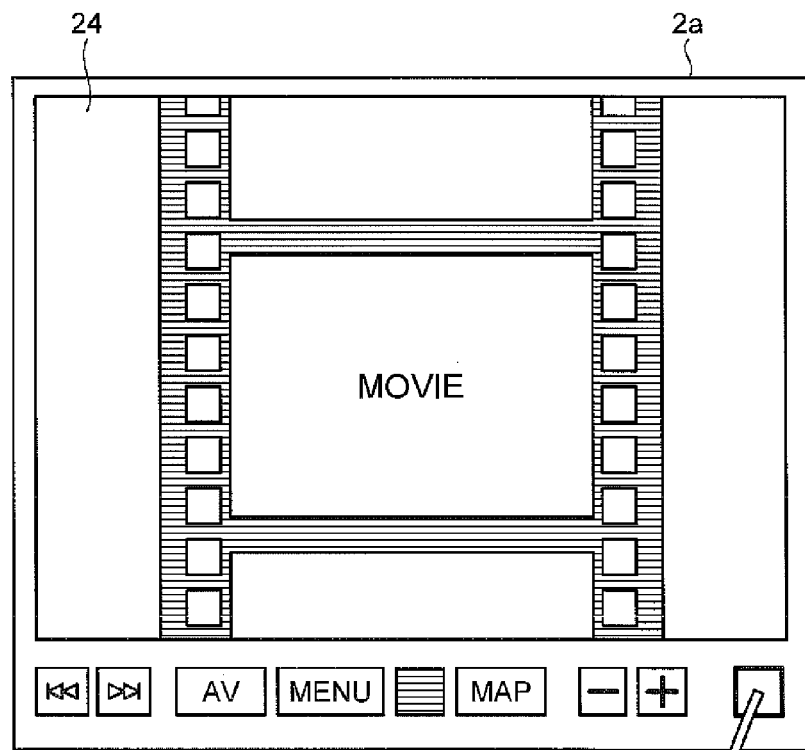
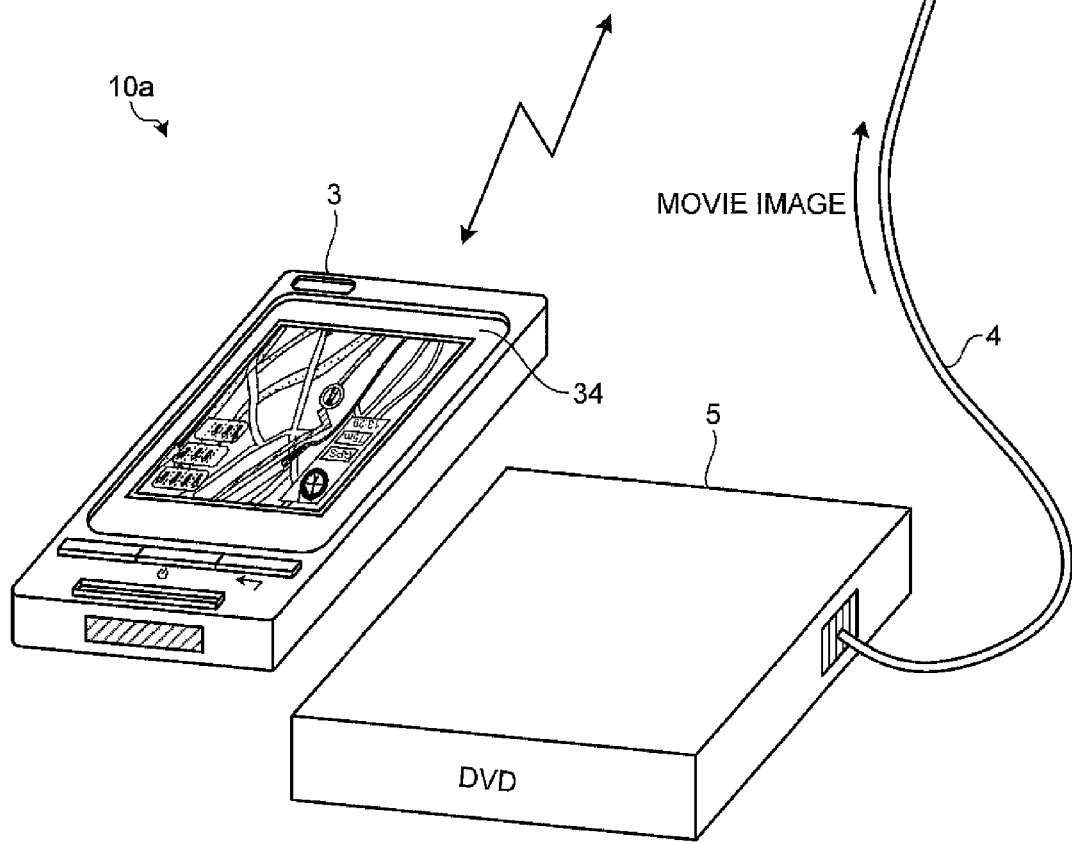

ON-VEHICLE DEVICE, COMMUNICATION METHOD, AND STORAGE MEDIUM

FIELD

The disclosed embodiments relate to an on-vehicle device, a communication method, and a program.

BACKGROUND

A technique of transmitting images on a mobile device such as a mobile telephone, smartphone, or the like, to an on-vehicle device, and referring to the images generated by the mobile device with use of a display screen of the on-vehicle device, has been known (see Patent Literature 1). For example, a user is able to drive a vehicle while referring to navigation images, generated by a mobile device, on a display screen of an on-vehicle device.

CITATION LIST

Patent Literature

Patent Literature 1: Japanese Laid-open Patent Publication No. 2009-035024

SUMMARY

Technical Problem

A mobile device which transmits images to be displayed on an on-vehicle device, as described above, is a particular mobile device with which communication is established through legitimate authentication. However, after navigation images generated by such a mobile device are allowed to be displayed on the on-vehicle device, if a user replaces the wiring for transmitting images, images transmitted from another device, not through legitimate authentication, may be able to be displayed on the on-vehicle device. In that case, there is a possibility that images not relevant to driving operation, such as movies, are displayed on the on-vehicle device.

Solution to Problem

An on-vehicle device according to an aspect of embodiments is configured to be able to communicate with a mobile device, and includes a reception unit, an interruption detection unit, a determination unit, and a display control unit. The reception unit receives image information transmitted from a particular mobile device which is a mobile device with which communication is established. The interruption detection unit detects that reception of the image information is interrupted. The determination unit determines whether or not the transmission device which transmits the image information is the particular mobile device, when the reception unit receives image information again after interruption of the reception is detected. The display control unit stops displaying the image information transmitted from the transmission device on a display device when the transmission device is determined not to be the particular mobile device.

BRIEF DESCRIPTION OF DRAWINGS

FIG. 3 is a drawing illustrating a conventional display system.

DESCRIPTION OF EMBODIMENTS

Hereinafter, embodiments of an on-vehicle device, a communication method, and a program disclosed in the present disclosure will be described in detail, with reference to the accompanying drawings. It should be noted that this invention is not limited to embodiments described below.

1. First Embodiment

1-1. Outline

Figure 1:
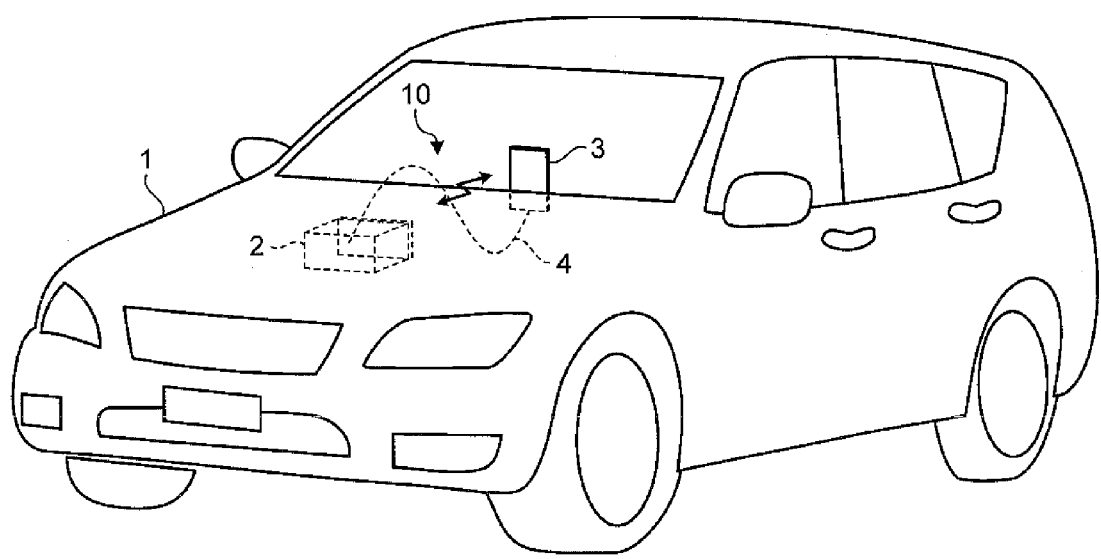
FIG. 1 is a drawing illustrating an outline of a display system according to a first embodiment.

FIG. 1 is a drawing illustrating an outline of a display system 10 of the present embodiment. The display system 10 is configured to include an on-vehicle device 2 mounted on a vehicle 1 such as an automobile, and a mobile device 3 configured independently of the on-vehicle device 2.

The on-vehicle device 2 is an electronic control device including a display which is a display device, and installed fixedly in a dashboard or the like at the front of a vehicle interior so as to allow a user who gets in the vehicle 1 to be able to view it easily. The on-vehicle device 2 is a reproducing device for images and music having a display, for example. It should be noted that the on-vehicle device 2 is a device used for a vehicle, which may be a mobile device held by a holder or the like provided in the vehicle, rather than the device fixedly installed in the vehicle interior of the vehicle 1.

The mobile device 3 is a portable electronic device such as a mobile telephone or a smartphone. When being used for the display system 10, the mobile device 3 is fixed on the dashboard or the like of the vehicle 1 by a holder which holds the mobile device 3. Such a holder is configured to allow the mobile device 3 to be attached or detached by the user as appropriate, and not to fix the mobile device 3 completely.

The on-vehicle device 2 and the mobile device 3 are connected in a communicable manner with each other. For example, the on-vehicle device 2 and the mobile device 3 communicate wirelessly to thereby perform authentication processing and transmission and reception of control data with each other. For wireless communication, Bluetooth (registered trademark), which is a near-field wireless communication standard for digital devices, is used, for example.

Further, the on-vehicle device 2 and the mobile device 3 are connected via a communication cable 4 through which image information can be transmitted and received. Images constituting frames of image information are transmitted continuously at a given cycle from the mobile device 3 to the on-vehicle device 2 via the communication cable 4. The communication cable 4 is a cable using HDMI (registered trademark) (High-Definition Multimedia Interface) which is a communication interface standard for transmitting images and sounds as digital signals, for example.

Figure 2:
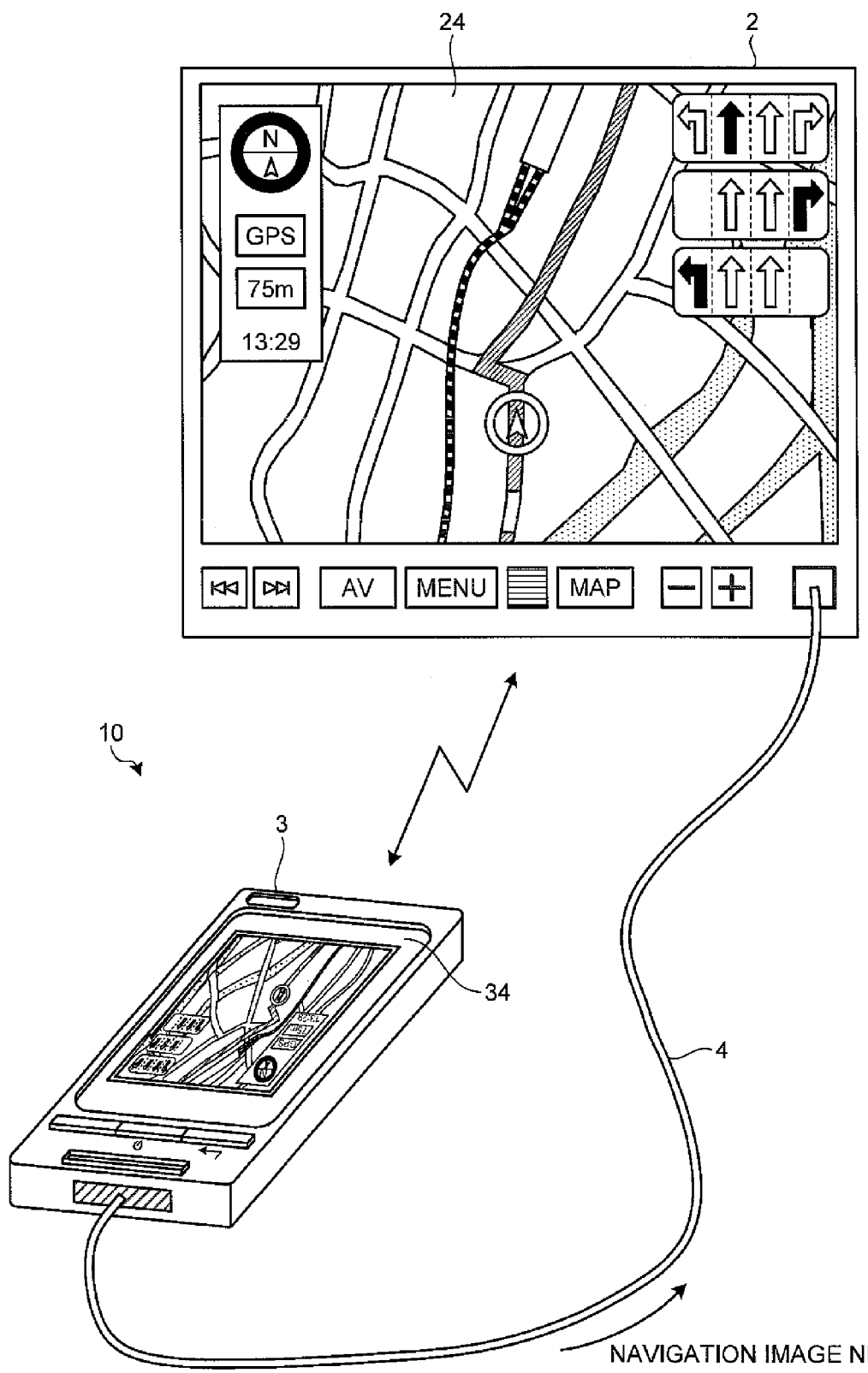
FIG. 2 is a drawing illustrating an outline of a function of the display system according to the first embodiment.

FIG. 2 is a drawing illustrating the outline of the function of the display system 10. The mobile device 3 converts navigation images NP, generated continuously, into frames of image information in a given format such as NTSC, and transmits the image information to the on-vehicle device 2 via the communication cable 4. If communication is established by authenticating the mobile device 3 by wireless communication, the on-vehicle device 2 displays the navigation images NP, transmitted from the mobile device 3 via the communication cable 4, on a display 24.

Here, description will be given on a travel regulation processing which is processing to prevent images not relevant to driving from being displayed on the display 24 when the vehicle 1 is travelling. The travel regulation processing is performed by the mobile device 3 when the mobile device 3 is authenticated and communication is established.

<Operation on Mobile Device Side>

The mobile device 3 acquires traveling information from the on-vehicle device 2 by wireless communication, and if it determines to be in a traveling state based on the acquired traveling information, the mobile device 3 performs control not to output images subjected to travel regulation (videos not relevant to driving such as DVD/TV, . . . , for example) to the on-vehicle device 2, and instead of such images, outputs images not subjected to travel regulation (for example, operation screen for navigation images NP or music, a message showing "under travel regulation" or the like, a still image such as a single-colored screen, or the like) to the on-vehicle device 2. The travel regulation processing is performed by a "mobile linkage application" installed in the mobile device 3, for example.

<Operation on on-Board Device Side>

When the on-vehicle device 2 is cooperated with an external device such as the mobile device 3 (for example, when authentication is made and wireless communication is established), the on-vehicle device 2 displays an image input from the external device on the display 24, regardless of whether the traveling state of the vehicle 1 is traveling, stopped, or parking. This means that when the on-vehicle device 2 and the external device are cooperated with each other, as travel regulation processing is performed on the external device side, travel regulation processing is not performed on the on-vehicle device 2 side.

On the other hand, in a state where it is connected with an external device such as the mobile device 3 but is not coordinated (for example, when authentication is not made and wireless communication is not established), the travel regulation processing as described above is performed by the on-vehicle device 2. This means that when the on-vehicle device 2 and the external device are not coordinated with each other, if an image is input to the on-vehicle device from the connected external device, the input image from the external device is controlled not to be displayed on the display 24 during traveling by the processing performed by the on-vehicle device 2 side.

Thereby, displaying of images not relevant to driving other than the navigation images NP, is prevented. With such a display system 10, even if the on-vehicle device 2 does not have a navigation function, a user (particularly, driver) is able to refer to navigation images NP, generated by the mobile device 3, on the display 24 of the on-vehicle device 2.

FIG. 3 is a drawing illustrating a conventional display system 10a. Even in the conventional display system 10a, an on-vehicle device 2a has a function of displaying, on the display 24, navigation images NP transmitted via the communication cable 4 from the mobile device 3 with which communication is established by authentication via wireless communication. FIG. 3 illustrates a state where, in the conventional display system 10a, the communication cable 4 is replaced from the mobile device 3, having been authenticated, to an image reproduction device 5 which is another transmission device. As a communicating state with the mobile device 3 is continued, even if connection of the communication cable 4 is replaced from the mobile device 3 to another image reproduction device 5 after authenticated communication has been established, the on-vehicle device 2a erroneously recognize to receive images from the mobile device 3 transmitting the navigation images NP. As such, the on-vehicle device 2a displays images transmitted via the communication cable 4 from the image reproduction device 5 not subjected to legitimate authentication, on the display 24. Accordingly, in that case, there is a possibility that the on-vehicle device 2a displays images not relevant to driving of the vehicle 1 such as movies reproduced by the image reproduction device 5 which is different from the mobile device 3.

In this way, in the conventional display system 10a, there is a case where the device connected with the communication cable 4 is replaced after communications are established through authentication, whereby images not relevant to driving such as movies reproduced by the image reproduction device 5 different from the mobile device 3 are displayed. The display system 10 of the present embodiment prevents images transmitted from the image reproduction device 5, which is a transmission device with which communication has not be established, from being displayed on the on-vehicle device 2. Hereinafter, the configuration and processing of such a display system 10 will be described in detail.

1-2. Configuration

Figure 4:
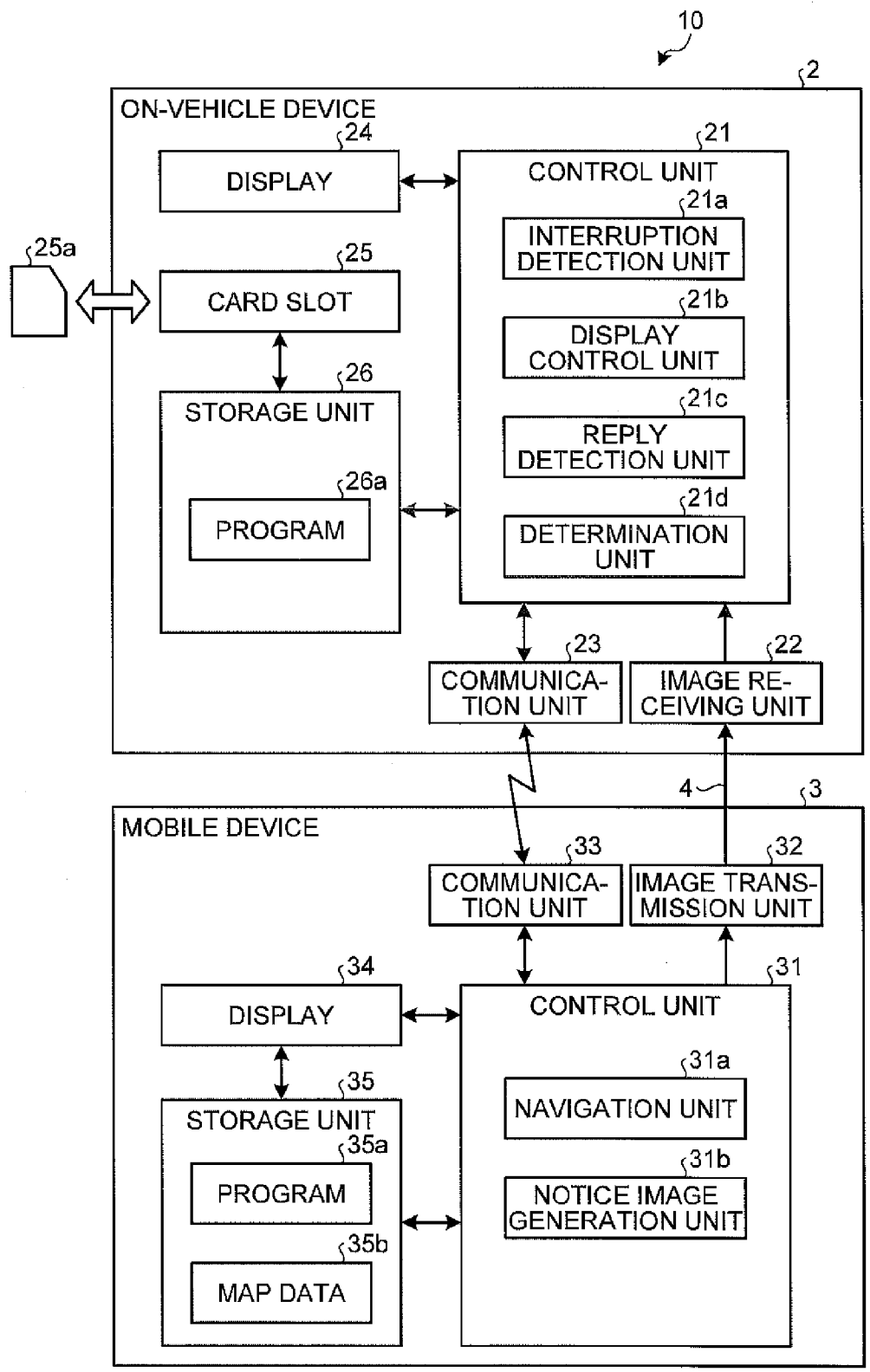
FIG. 4 is a block diagram illustrating a configuration of the display system according to the first embodiment.

FIG. 4 is a block diagram illustrating a configuration of the display system 10. In the drawing, the upper level illustrates a configuration of the on-vehicle device 2, and the lower level illustrates a configuration of the mobile device 3.

The on-vehicle device 2 is an electronic control device including a control unit 21, an image receiving unit 22, a communication unit 23, a display 24, a card slot 25, and a storage unit 26. The control unit 21 is a microcomputer including a CPU, a RAM, a ROM, and the like, and controls the entire on-vehicle device 2.

The image receiving unit 22 receives image information transmitted from the mobile device 3 with which communication has been established or a transmission device other than the mobile device 3, via the communication cable 4. The image information is navigation images NP generated by the mobile device 3, for example.

The communication unit 23 transmits and receives data with the mobile device 3 by a communication method such as Bluetooth (registered trademark) or the like. For example, the communication unit 23 establishes communication with the mobile device 3 by performing so-called pairing processing including authentication and the like, before image information is received by the image receiving unit 22 from the mobile device 3.

The display 24 includes a liquid crystal panel or the like, and displays various types of information. Further, the display 24 may include a touch panel and accept operations by a user. When a user touches the display 24 as a touch panel, the control unit 21 determines the operation content by the user based on the coordinate position on the display 24 touched by the user.

The card slot 25 is configured to store a memory card 25a, which is a portable record medium, in an attachable/detachable manner, and perform reading and writing of data from/to the memory card 25a.

The storage unit 26 is a non-volatile memory such as a flash memory which stores various types of information. Further, the storage unit 26 stores a program 26a. By performing arithmetic processing by the control unit 21 in accordance with the program 26a, various types of functions in the control unit 21 are realized. An interruption detection unit 21a, a display control unit 21b, a reply detection unit 21c, and a determination unit 21d, shown in the control unit 21, are part of the functions realized by means of software by execution of the program 26a.

The interruption detection unit 21a detects, after the image receiving unit 22 receives image information transmitted from the mobile device 3, that reception of the image information is interrupted. Thereby, the interruption detection unit 21a substantially detects that the device connected with the communication cable 4 is replaced by the user. If the image receiving unit 22 does not receive image information for a predetermined time continuously, the interruption detection unit 21a detects that transmission of the image information is interrupted. It should be noted that while a predetermined time may be one second, for example, it may be any period of time within which replacement of the device connected with the communication cable 4 by the user can be detected. Further, a predetermined time is preferably a period of time within which instantaneous interruption of transmission or reception due to vibration or the like is distinguishable, from interruption due to replacement of the device. This is because when the display system 10 is used for a vehicle, it is placed under an environment where vibration or the like is easily caused.

The display control unit 21b controls the display 24 and performs control relating to displaying of the display 24. The display control unit 21b allows the navigation image NP transmitted from the mobile device 3 to be displayed on the display 24. Further, when allowing the image transmitted from the mobile device 3 to be displayed, the display control unit 21b allows a notice image IP, for giving a predetermined notice to the user, to be displayed on the display 24. The notice image IP will be described in detail below.

The reply detection unit 21c detects that a reply from the user is made, when the user replies to the notice image IP displayed on the display 24 by touching the touch panel within a predetermined time.

The determination unit 21d determines whether or not a transmission device, which transmits image information, is a legitimate mobile device. For example, after detection of interruption of image information by the interruption detection unit 21a, if image information is received again by the image receiving unit 22, when a reply from the user to a notice image IP displayed on the display 24 is detected, the determination unit 21d determines that the transmission device, which transmits the image information, is the mobile device 3 (particular mobile device) with which communication was established by the communication unit 23 before detection of the interruption.

Further, after detection of interruption of image information, if the image receiving unit 22 receives image information again, for example, the determination unit 21d determines whether or not the transmission device, which transmits the received image information, is a mobile device with which communication is newly established by pairing processing. Then, if the determination unit 21d determines that the transmission device which transmits the image information is a mobile device with which communication is newly established, the determination unit 21d determines that the transmission device is a device which transmits image information on which the travel regulation processing, described above, is performed.

The mobile device 3, illustrated in the lower level in the drawing, includes a control unit 31, an image transmission unit 32, a communication unit 33, a display 34, and a storage unit 35.

The control unit 31 is a microcomputer which includes a CPU, a RAM, a ROM, and the like, and controls the entire mobile device 3.

The image transmission unit 32 transmits image information to the on-vehicle device 2 via the communication cable 4. The image transmission unit 32 converts the navigation images NP continuously generated by the mobile device 3, the notice images IP, described below, and the like, into frames of image information in a given format such as NTSC, and transmits such image information to the on-vehicle device 2.

The communication unit 33 performs transmission and reception of data with the on-vehicle device 2 by means of a communication system such as Bluetooth (registered trademark). For example, before the image transmission unit 32 transmits image information to the on-vehicle device 2, the communication unit 33 performs so-called pairing processing including authentication and the like to thereby establish communication with the on-vehicle device 2. The communication unit 33 of the present embodiment uses a determination result by the determination unit 21d for authentication for establishing communication of this kind. Further, when a user operates to perform communication with respect to the on-vehicle device 2 and the mobile device 3, and when a user replies to the notice image IP by the reply detection unit 21c, the communication unit 33 establishes communication.

The display 34 includes a liquid crystal panel, and displays various types of information. The display 34 also includes a touch panel, and is able to accept operation by a user. When a user touches the display 34 as a touch panel, the control unit 31 determines the content of operation by the user based on the coordinate position touched by the user.

The storage unit 35 is a non-volatile memory such as a flash memory which stores various types of information. The storage unit 35 also stores a program 35a and map data 35b. By performing arithmetic processing by the control unit 31 according to the program 35a, various types of functions in the control unit 31 are realized. A navigation unit 31a and a notice image generation unit 31b, shown in the control unit 31, are part of the functions realized by means of software by execution of the program 35a.

The navigation unit 31a realizes a navigation function of performing route guidance to the destination, which is a function of an application realized with use of the map data 35b by execution of the program 35a. The navigation images NP transmitted by the image transmission unit 32 to the on-vehicle device 2, are provided by the navigation unit 31a. The navigation unit 31a generates a map image showing the map around the vehicle 1, based on the map data 35b stored in the storage unit 35 and the vehicle position. Further, if a destination is set by the user, the navigation unit 31a derives a route from the vehicle position of the current point to the destination, and superimposes the route on the map image. It should be noted that the navigation unit 31a acquires data from a GPS or an azimuth sensor not shown.

The map data 35b is road map data including node and link information of roads, and latitude/longitude information and address information of various facilities.

1-3. Notice Image

Figure 5:
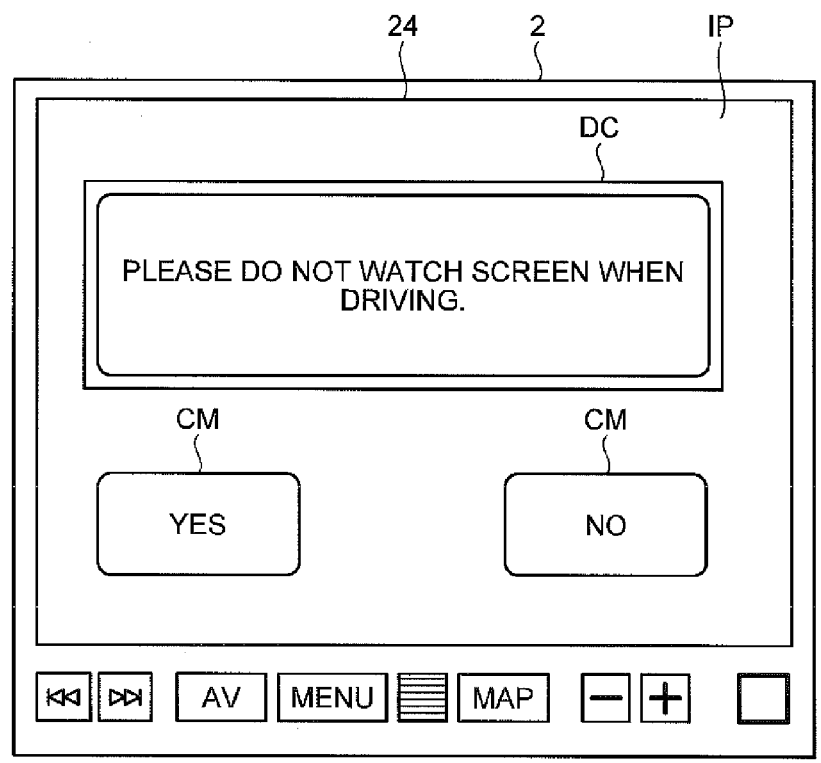
FIG. 5 is a drawing illustrating an example of a notice image.

The notice image generation unit 31b generates a notice image IP illustrated in FIG. 5. FIG. 5 is an example of the notice image IP displayed on the display 24 of the on-vehicle device 2 when communication between the on-vehicle device 2 and the mobile device 3 is established. The notice image IP generated by the notice image generation unit 31b is transmitted to the on-vehicle device 2 by the image transmission unit 32 along with the navigation image NP. When the on-vehicle device 2 receives the notice image IP by the image receiving unit 22, the on-vehicle device 2 allows the notice image IP to be displayed on the display 24 by the display control unit 21b.

The notice image IP shows notice information which should be notified to the user, and is configured of a message DC to the user and command buttons CM which detect a reply from the user. The message DC has a notice content of alerting the user such as "Please do not watch screen when driving.", for example. Further, the command buttons CM have contents showing a reply from the user such as "Yes" and "No". This means that the contents displayed by the message DC and the command buttons CM have a relationship of a notice and a reply to the notice.

In this way, by displaying the notice image IP generated by the mobile device 3 and causing the user to reply to the notice, it is possible to determine that the image displayed on the display 24 is an image transmitted from the image transmission unit 32 of the mobile device 3. If there is no such a reply from the user, it is the case where the notice image IP is not displayed on the display 24, that is, it can be assumed that an image generated by a device other than the mobile device 3, that is, an image transmitted from the image reproduction device 5 for example, is displayed on the display 24. In that case, the display control unit 21b is able to prevent an image, generated by a device other than the mobile device 3, from being displayed, by stopping displaying the image, or the like. As such, displaying of the notice image IP is performed before displaying of the navigation image. After acquiring a reply from the user to the notice image IP, communication between the on-vehicle device 2 and the mobile device 3 is established, and then, the navigation image is allowed to be displayed on the on-vehicle device 2. Thereby, the on-vehicle device 2 is able not to display images generated by a device other than the mobile device 3, and is able to display images transmitted from the image transmission unit 32 of the mobile device 3.

Figure 6:
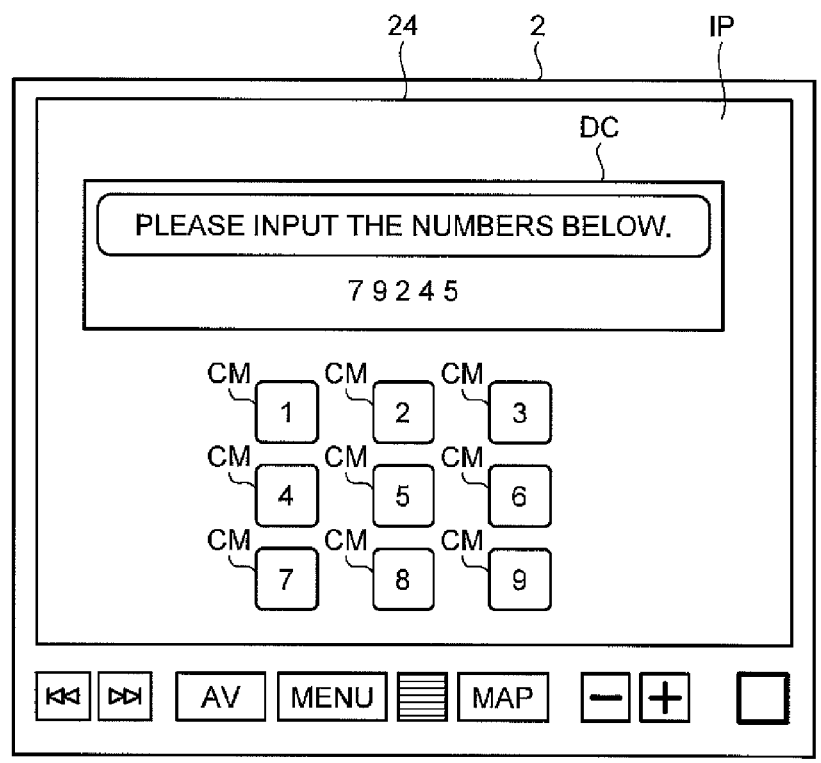
FIG. 6 is a drawing illustrating another example of a notice image.

FIG. 6 is another example of a notice image IP. In the notice image IP illustrated in FIG. 6, characters of "Please input the numbers below." are shown in the message DC, and the numbers 1 to 9 are shown on the command buttons CM. When the user inputs the numbers displayed in the message DC by operating the command buttons CM, the user is able to reply to the message DC. In this way, the notice image IP may be not only an image displaying a message relevant to driving of the vehicle as illustrated in FIG. 5 and receiving a reply to the message, but also an image prompting input of simple numerical values and receiving a reply of such numerical values. This means that the notice image IP may be one which is able to prompt the user to make a reply and detect presence or absence of such a reply. If a reply supposed to be made by the notice image IP is made, it can be determined that the image displayed on the display 24 is an image transmitted from the image transmission unit 32 of the mobile device 3.

In this way, by configuring an image transmitted from the image transmission unit 32 of the mobile device 3 to include the notice image IP, and before displaying a navigation image, performing displaying of the notice image IP and detection of a reply when establishing communication between the on-vehicle device 2 and the mobile device 3, it is possible to prevent an image, generated by a device other than the mobile device 3, from being displayed, and allow an image transmitted from the mobile device 3 to be displayed.

1-4. Processing Procedure

Figure 7:
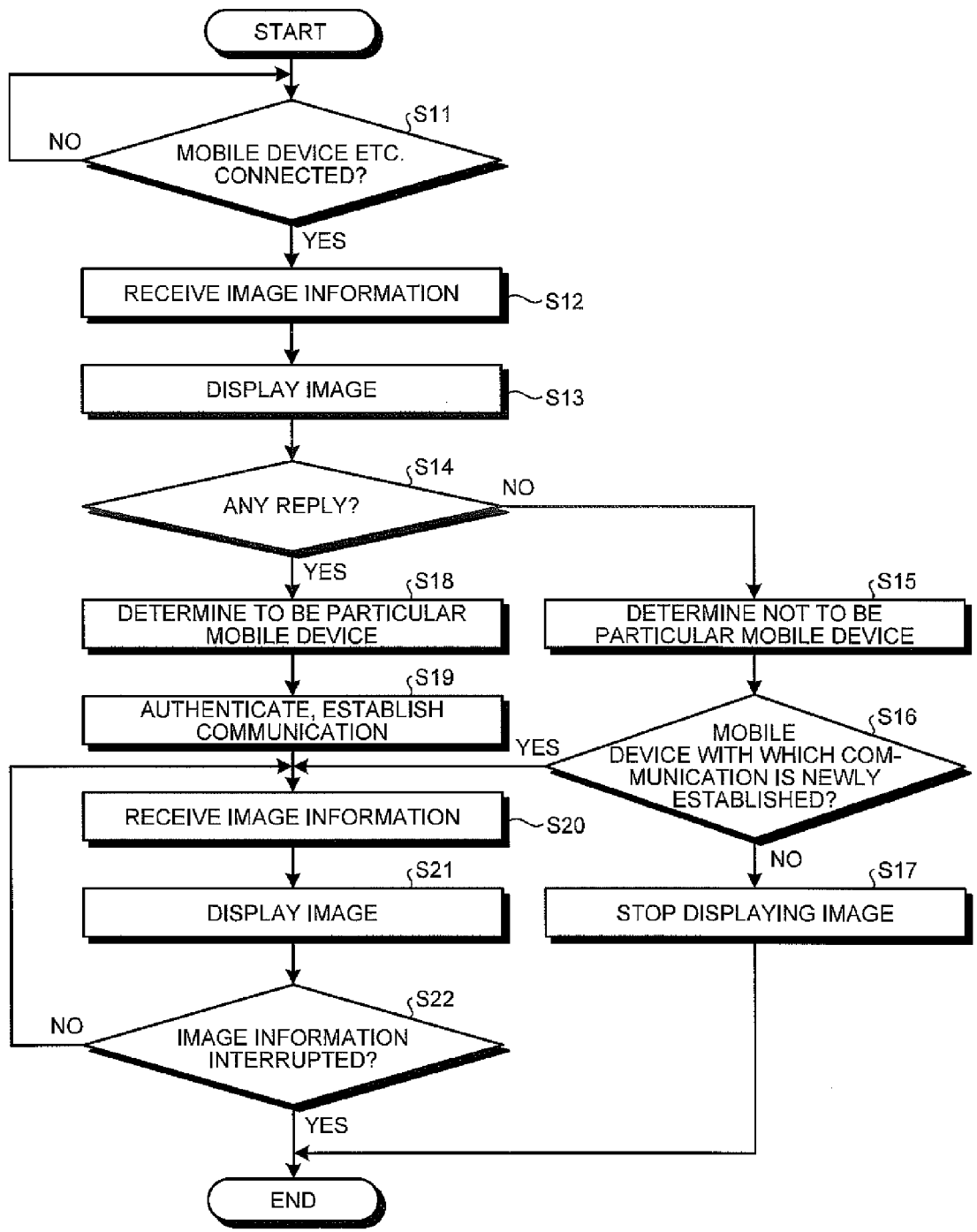
FIG. 7 is a flowchart illustrating a processing procedure of an on-vehicle device according to the first embodiment.

FIG. 7 is a flowchart illustrating a processing procedure of the on-vehicle device 2. This processing starts along with execution of initial processing of performing communication between the on-vehicle device 2 and the mobile device 3.

When initial processing of performing communication between the on-vehicle device 2 and the mobile device 3 is performed by the user, the on-vehicle device 2 newly performs processing to establish communication by performing authentication. Specifically, first, the control unit 21 determines whether or not the mobile device 3 or a transmission device other than the mobile device 3 (hereinafter, also referred to as a "mobile device or the like") is connected via the communication cable 4 (step S11). If a mobile device or the like is not connected (No at step S11), the processing of step S11 is repeated. On the other hand, if it is determined that a mobile device or the like is connected (Yes at step S11), image information transmitted from the mobile device or the like is received via the communication cable 4. For example, if the mobile device 3 is connected (step S12), the notice image IP is received. It should be noted that if a transmission device other than the mobile device 3 is connected, image information not relevant to driving of the vehicle 1 is received, for example. When the image information is received by the image receiving unit 22, the display control unit 21b displays the image information on the display 24 (step S13).

Next, the reply detection unit 21c detects whether or not a reply is made from the user to the displayed image information (step S14). It should be noted that if the image information is the notice image IP, the reply detection unit 21c detects whether or not a reply from the user is made within the predetermined time as described above after the notice image IP is displayed on the display 24. If the reply detection unit 21c does not detect a reply from the user within the predetermined time (No at step S14), the determination unit 21d determines that the transmission device which transmits the image information is not a particular mobile device, namely the mobile device 3, specifically (step S15).

Then, the determination unit 21d determines whether or not the transmission device which transmits the image information received by the image receiving unit 22 is a mobile device with which communication is newly established (step S16). Here, whether or not communication is newly established by pairing processing between the on-vehicle device 2 and the transmission device, is determined, for example. If communication is not established and it is determined that the transmission device is not the mobile device with which communication is newly established (No at step S16), displaying of the image transmitted from the transmission device on the display 24 of the on-vehicle device 2 is stopped (step S17). This is because in that case, the transmission device attempting to establish communication may be a transmission device on which authentication processing was not performed. After completion of this processing, the on-vehicle device 2 does not communicate with and receive images from other devices until execution of initial processing is operated again by the user.

On the other hand, if the reply detection unit 21c detects a reply from the user within the predetermined time (Yes at step S14), it is determined that the transmission device which transmits the image information is a particular mobile device, namely, the mobile device 3 (step S18). Then, the communication unit 23 of the on-vehicle device 2 authenticates the mobile device 3 as a legitimate transmission device, and establishes communication with the mobile device 3 (step S19). When establishing the communication, so-called pairing processing, which is performed by transmitting and receiving given data between the communication unit 23 and the communication unit 33, is performed. By performing authentication processing in this way, the on-vehicle device 2 prevents reception of images transmitted from those other than a predefined legitimate transmission device to thereby prevent images not relevant to driving of the vehicle from being displayed. Accordingly, a transmission device authenticated at step S19 is limited to a device which is known beforehand to transmit images relevant to driving such as the navigation image NP. It should be noted that execution of initial processing and processing to establish communication are performed when a predetermined operation is performed by the user on the on-vehicle device 2 and the touch panel of the mobile device 3 or push buttons not shown. Hereinafter, a mobile device with which communication is established through such authentication by the on-vehicle device 2 is also referred to as a "particular mobile device".

Upon completion of the processing to establish communication, the image receiving unit 22 receives image information transmitted from the mobile device 3 via the communication cable 4 (step S20). It should be noted that the image information is the navigation image NP generated by the mobile device 3.

Further, when communication is established by pairing processing between the on-vehicle device 2 and the transmission device, and the transmission device is determined to be a mobile device with which communication is newly established (Yes at step S16), the image information is received similarly (step S20).

When the image receiving unit 22 receives the navigation image NP transmitted from the mobile device 3, the display control unit 21b displays the received navigation image NP on the display 24 (step S21). Thereby, the user (particularly, the driver of the vehicle 1) is able to refer to the navigation image NP, generated by the mobile device 3, on the display 24 of the on-vehicle device 2.

When the navigation image NP is displayed on the display 24 by the display control unit 21b, the interruption detection unit 21a determines whether or not reception of the image information from the mobile device 3 is interrupted (step S22). As described above, the interruption detection unit 21a detects that reception of the image information is interrupted when the image receiving unit 22 does not receive the image information for one second continuously, for example. The case where such interruption of the image information is detected is not the case of occurrence of instantaneous interruption of transmission and reception due to vibration or the like, but the case which is determined to be replacement of the device connected with the communication cable 4 by the user, and the case where image information not relevant to driving of the vehicle may be transmitted to the on-vehicle device 2.

If interruption of reception of the image information is not detected (No at step S22), the processing returns to step S20 and the image receiving unit 22 receives the navigation image NP transmitted from the mobile device 3, and the display control unit 21b displays the image (step S21). In this way, if the interruption detection unit 21a determines that there is no interruption of the image information, reception and displaying of the navigation image NP and determination of interruption of the image information are performed repeatedly. It should be noted that determination of interruption of image information by the interruption detection unit 21a is performed repeatedly until the user performs predetermined ending processing or until a route guide by the navigation unit 31a ends and the image receiving unit 22 does not receive the navigation image NP any more.

On the other hand, if interruption of reception of the image information is detected (Yes at step S22), the present processing is stopped. Then, when initial processing is performed again by the user, the processing after step S11 is performed again. This means that a mobile device or the like is connected (Yes at step S11), and when the image receiving unit 22 receives image information again (step S12), the on-vehicle device 2 once releases the communication established before detection of interruption of the image information, and performs authentication again and newly performs processing to establish communication. Specifically, first, the display control unit 21b displays the image information, received from the mobile device or the like, on the display 24. If the transmission device which transmits the image information is a particular mobile device, the notice image IP is transmitted to the on-vehicle device 2 as image information for authentication for establishing communication. As such, if the transmission device is a particular mobile device, the notice image IP is displayed on the display 24 (step S13).

Next, the reply detection unit 21c detects whether or not a reply from the user to the displayed display image (notice image IP) is made (step S14). If the reply detection unit 21c does not detect a reply from the user (No at step S14), the determination unit 21d determines that the transmission device which transmits the image information to the image receiving unit 22 is not the mobile device with which communication was established before interruption of reception is detected, namely, the particular mobile device (step S15).

Then, the determination unit 21d determines whether or not the transmission device, which transmits the image information received by the image receiving unit 22 after detection of interruption of reception, is a mobile device with which communication is newly established by pairing processing (step S16). If it is determined that the transmission device is the mobile device 3 with which communication is newly established (Yes at step S16), the processing moves to step S20 and after, and the navigation image NP received by the image receiving unit 22 from the mobile device 3 is displayed on the display 24 (step S21). This means that if it is determined that the transmission device is the mobile device 3 with which communication is newly established, as image information on which the travel regulation processing described above is performed (for example, navigation image NP) is received by the image receiving unit 22, the image information is allowed to be displayed on the display 24.

On the other hand, if the determination unit 21d determines that the transmission device, which transmits the image information received by the image receiving unit 22 after detection of interruption, is neither a mobile device with which communication is newly established nor the particular mobile device (No at step S15 and step S16), displaying of the image transmitted from the transmission device, which transmits the image information after detection of interruption of the image information, on the display 24 of the on-vehicle device 2 is stopped (step S17). This is because in that case, there is a possibility that the device connected with the communication cable 4 is replaced, and that an image not including the notice image IP or an image not relevant to driving of the vehicle, on which the travel regulation processing is not performed, is transmitted from an image reproduction device different from the mobile device 3 to the on-vehicle device 2. In this way, if it is determined that the transmission device which transmits the image information is neither a mobile device with which communication is newly established nor the particular mobile device, displaying of the image information, received again, on the display 24 is stopped. As such, it is possible to prevent an image transmitted from a transmission device other than the particular mobile device or an image on which the travel regulation processing described above is not performed, from being displayed. It should be noted that after completion of this processing, the on-vehicle device 2 does not perform communication with and receive images from other devices until execution of initial processing is operated again by the user.

On the other hand, if the reply detection unit 21c detects a reply from the user (Yes at step S14), the determination unit 21d determines that the transmission device which transmits the image information to the image receiving unit 22 is the mobile device with which communication was established before interruption of reception is detected, namely, the particular mobile device (step S18). Then, the processing moves to step S19 and after, and the processing described above is performed. As such, if it is determined that the transmission device which transmits the image information is the particular mobile device, the image information, received again, is allowed to be displayed on the display 24. Accordingly, it is possible to prevent images transmitted from a transmission device other than the particular mobile device from being displayed, as in the case described above.

Further, as it is determined that the transmission device which transmits the image information is the particular mobile device if a reply from the user to the notice image IP displayed on the display 24 is detected, it is possible to easily determine whether or not the transmission device is the particular mobile device, and there is no possibility of determining a transmission device not transmitting the notice image IP to be the particular mobile device.

In this way, if image information is received again after interruption of reception of the navigation image NP transmitted from the mobile device 3 is detected, for example, the on-vehicle device 2 establishes communication with the transmission device through authentication again, to thereby determine whether or not the transmission device which transmits the image information after detection of interruption is the particular mobile device. When establishing communication, the on-vehicle device 2 detects a reply operation by the user to the notice image IP transmitted from the transmission device which is a candidate of establishing communication. If there is a reply to the notice image IP, it can be determined that the received image information is transmitted from the legitimate mobile device 3. Thereby, the on-vehicle device 2 determines whether or not the transmission device which transmits the image information, after detection of interruption of image information, is the particular mobile device with which communication was established before interruption of reception. Then, if the transmission device is not the particular mobile device, the on-vehicle device 2 ends the processing, and does not display images transmitted from the transmission device.

As described above, in the first embodiment, the on-vehicle device 2 detects that reception of image information is interrupted, and when image information is received again after detection of interruption of reception, determines whether or not the transmission device which transmits the image information is the particular mobile device, and if it is determined that the transmission device is not the particular mobile device, stops displaying the image information transmitted from the transmission device on the display device. As such, it is possible to prevent images, transmitted from a transmission device other than the particular mobile device, from being displayed.

2. Second Embodiment 2-1. Outline

Hereinafter, a second embodiment will be described. The display system 10 according to the second embodiment includes the same configuration and processing as those of the display system 10 of the first embodiment. As such, description will be given below focusing on the differences from the first embodiment.

In the first embodiment, interruption of reception of the navigation image NP transmitted from the mobile device 3 with which communication has been established is detected, and after detection of such interruption, communication with a transmission device are established again through second authentication, whereby it is determined whether or not the transmission device, which transmits image information after detection of interruption, is the mobile device (particular mobile device) with which communication was established before interruption of reception.

Meanwhile, in the second embodiment, interruption of reception of the navigation image NP transmitted from the mobile device 3 with which communication has been established is detected, and if image information is received again after detection of interruption, the on-vehicle device 2 detects authentication information included in the navigation image NP, that is, an image for authentication, for example. A video signal of a legitimate navigation image NP of the present embodiment includes a particular authentication image between respective frames. The on-vehicle device 2 detects the authentication image included in the received image information to thereby determine whether or not the transmission device which transmits the image information after detection of interruption is the transmission device (particular mobile device) with which communication has been established before interruption of reception. Thereby, it is possible to accurately determine whether or not the transmission device which transmits the image information, received again, is the particular mobile device. Further, as an authentication image detection unit 21e detects the authentication image included in the image information, the user does not need to perform reply operation as in the case of the first embodiment, whereby operability of the on-vehicle device 2 is improved.

2-2. Configuration

Figure 8:
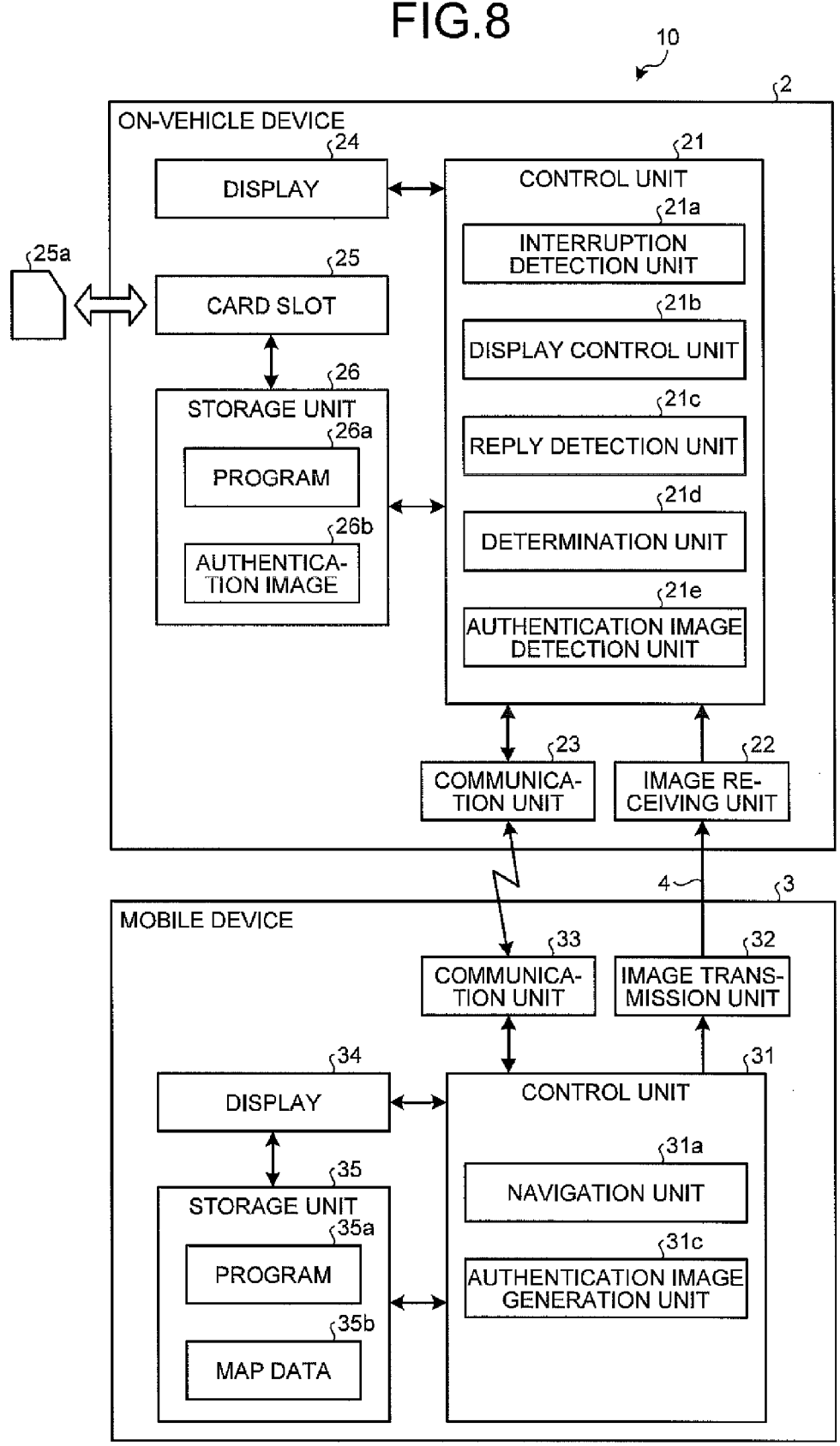
FIG. 8 is a block diagram illustrating a configuration of a display system according to a second embodiment.

FIG. 8 is a block diagram illustrating a configuration of the display system 10 of the second embodiment. Differences from the first embodiment are that the control unit 21 of the on-vehicle device 2 includes the authentication image detection unit 21e, that the storage unit 26 stores an authentication image 26b, and that the control unit 31 of the mobile device 3 includes an authentication image generation unit 31c. Further, the conditions based on which the determination unit 21d performs determination are also different. Other configurations are configured and work in the same manner as those of the first embodiment.

The authentication image detection unit 21e detects whether or not an authentication image transmitted by being included in the navigation image NP, from the mobile device 3, is a predetermined image. That is, the authentication image detection unit 21e refers to the authentication image 26b, described in detail below, stored in the storage unit 26, and detects whether or not the authentication image transmitted from the mobile device 3 matches the authentication image 26b stored in the storage unit 26.

The authentication image 26b is information for authentication consisting of a screen in which a white color and a block color are switched at constant timing, a video which is turned on/off at constant timing, or the like. However, such a screen, a video, or the like does not need to have any meaning, and it is only necessary that it can work as an identifier of a device, because it is not an image that a user should identify.

The authentication image generation unit 31c generates a predetermined authentication image that the authentication image detection unit 21e should detect. The authentication image generated by the authentication image generation unit 31c is included in the navigation image NP generated by the navigation unit 31a, and is transmitted to the on-vehicle device 2 by the image transmission unit 32. It should be noted that the authentication image generated by the authentication image generation unit 31c is the same information as the authentication image 26b stored in the storage unit 26 in advance.

When the image receiving unit 22 receives image information again after detection of interruption of image information by the interruption detection unit 21a, if the authentication image transmitted to the authentication image detection unit 21e by the mobile device 3 matches the authentication image 26b stored in the storage unit 26, the determination unit 21d determines that the transmission device which transmits the image information is the mobile device 3 (particular mobile device) with which communication has been established before detection of interruption.

2-3. Processing Procedure

Figure 9:
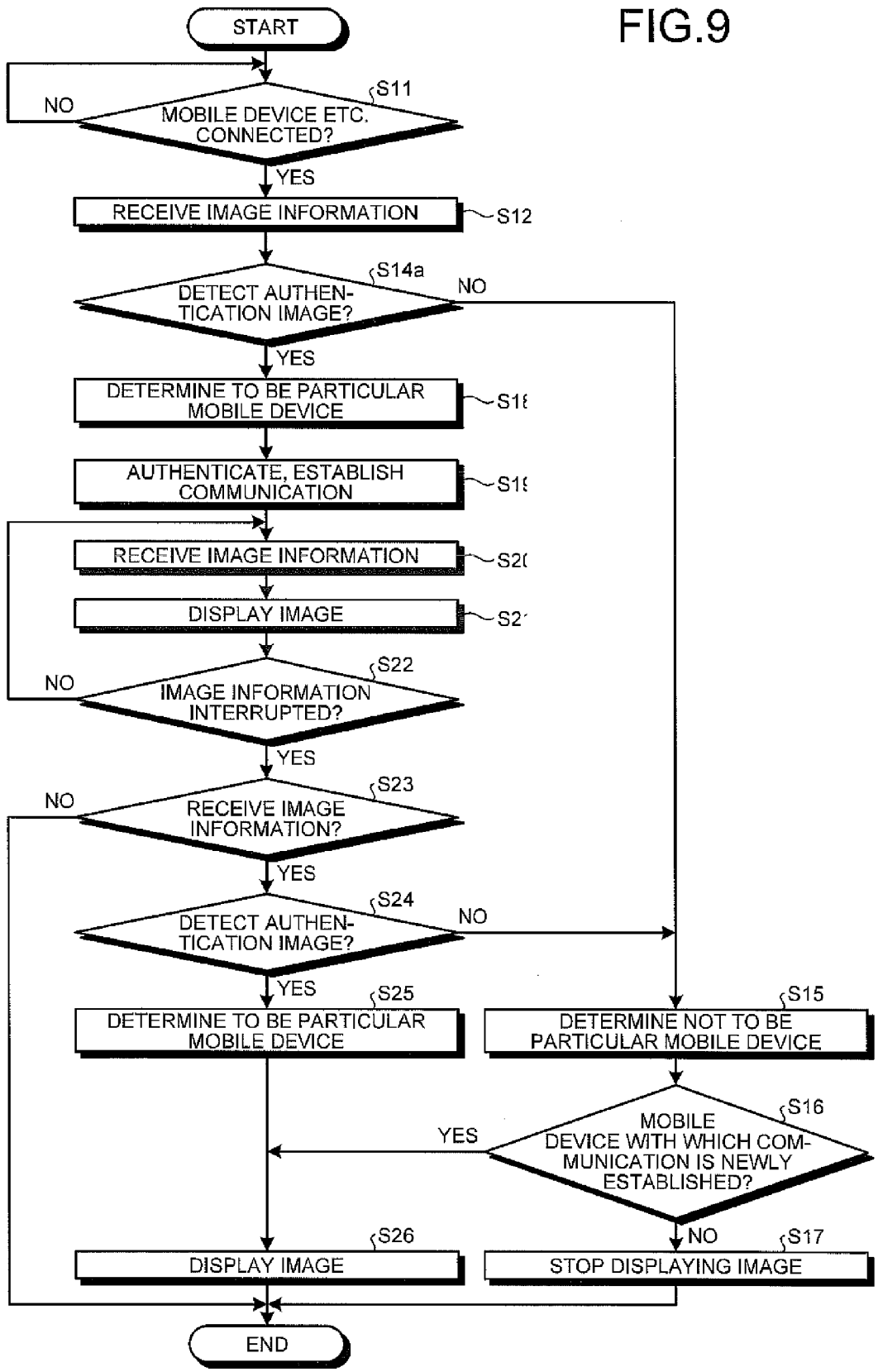
FIG. 9 is a flowchart illustrating a processing procedure of an on-vehicle device according to the second embodiment.

FIG. 9 is a flowchart illustrating a processing procedure of the on-vehicle device 2 of the second embodiment. It should be noted that in FIG. 9, the same processing as that of the first embodiment is denoted by the same step number, and the description thereof is not given.

When a mobile device or the like is connected (Yes at step S11) and the image receiving unit 22 receives image information (step S12), the authentication image detection unit 21e refers to the authentication image 26b stored in the storage unit 26, and detects whether or not an authentication image included in the image information transmitted from the mobile device or the like matches the authentication image 26b stored in the storage unit 26 (step S14a).

If the authentication image detection unit 21e detects that the authentication image 26b and the authentication image transmitted from the mobile device or the like do not match (No at step S14a), the determination unit 21d determines that the transmission device which transmits the image information is not the particular mobile device (step S15). Then, if the determination unit 21d determines that the transmission device which transmits the image information received by the image receiving unit 22 is not a mobile device with which communication is newly established (No at step S16), displaying of the image transmitted from the transmission device on the display 24 is stopped (step S17). As such, in that case, the transmission device attempting to establish communication may be a transmission device on which authentication processing was not performed.

On the other hand, if authentication information of the image information transmitted from the mobile device or the like is detected (Yes at step S14a), it is determined that the transmission device which transmits the image information is the particular mobile device (step S18), and then processing from S19 to step S22 is performed. If the interruption detection unit 21a determines that reception of the image information from the mobile device 3 is interrupted (Yes at step S22), it is determined whether or not the image receiving unit 22 receives image information again (step S23). If the image receiving unit 22 does not receive image information again (No at step S23), the present processing ends, because there is no need to perform the present processing relating to image processing, as image information to be displayed is not received. It should be noted that when the interruption detection unit 21a does not receive an image for a predetermined time continuously after detection of interruption of image information, the image receiving unit 22 determines that image information is not received again. Such a predetermined time is preferably a period of time in which it is possible to determine whether it is the case where a connection is released temporary for preventing looseness of a connection of the communication cable 4 and then re-connection is performed, it is the case where the device connected with the communication cable 4 is replaced by the user, or it is the case where the user has no intention to display the navigation image NP anymore and a connection between the communication cable 4 and the on-vehicle device 2 (or the mobile device 3) is released (that is, no-reconnection is made after releasing the connection). For example, the image receiving unit 22 may determine that it is a reconnection after temporal release if the time until the image is received again after detection of interruption is less than two seconds, determine that it is replacement of the device connected with the communication cable 4 if the time is not less than two seconds but less than five seconds, and determine that it is the case where reconnection will not be made after release of the connection if the time is not less than five seconds. Accordingly, if it is determined that the image receiving unit 22 receives image information again in less than two seconds after the interruption detection unit 21a detected interruption of image information, the device which transmits the image information to the image receiving unit 22 may be determined to be the device which transmitted the image information to the on-vehicle device 2 before detection of interruption.

When the image receiving unit 22 receives the image information again (Yes at step S23), the authentication image detection unit 21e detects whether or not the authentication image of the image information transmitted from the mobile device or the like matches the authentication image 26b stored in the storage unit 26 (step S24), as in the case of S14a described above.

If the authentication image detection unit 21e detects that the authentication image 26b and the authentication image transmitted from the mobile device or the like do not match (No at step S24), the determination unit 21d determines that the transmission device which transmits the image information to the image receiving unit 22 is not the mobile device with which communication has been established before interruption of reception is detected, that is, the particular mobile device (step S15). Then, if it is determined that the transmission device which transmits the image information received by the image receiving unit 22 after detection of interruption of reception is not a mobile device with which communication is newly established (No at step S16), displaying of the image transmitted from the transmission device which transmits the image information after detection of interruption of image information, on the display 24 of the on-vehicle device 2, is stopped (step S17). In that case, there is a possibility that the device connected with the communication cable 4 is replaced and that an image not including the authentication image and not relevant to driving of the vehicle is transmitted from an image reproduction device other than the mobile device 3 to the on-vehicle device 2. Thereby, it is possible to prevent images transmitted from a transmission device other than the particular mobile device and images on which the travel regulation processing is not performed, from being displayed. Further, after completion of this processing, the on-vehicle device 2 does not perform communication with and receive images from other devices until execution of initial processing is operated again by the user.

On the other hand, if the authentication image detection unit 21e detects that the authentication image 26b and the authentication image transmitted from the mobile device or the like match (Yes at step S24), the determination unit 21d determines that the transmission device which transmits the image information to the image receiving unit 22 is the mobile device with which communication has been established before interruption of reception is detected, that is, the particular mobile device (step S25).

It should be noted that in the present embodiment, even if the determination unit 21d determines that it is the particular mobile device at step S25, the on-vehicle device 2 does not perform authentication processing again for establishing communication with the mobile device 3, that is, does not perform processing of S19 again, which is different from the first embodiment. This is because by keeping establishment of communication between the communication unit 23 of the on-vehicle device 2 and the communication unit 33 of the mobile device 3 at all time, release and reestablishment of communication performed in the first embodiment are omitted, to thereby make the processing procedure efficient and improve the communication speed.

Accordingly, when the determination unit 21d determines that the transmission device which transmits the image information to the image receiving unit 22 is the particular mobile device, the display control unit 21b immediately displays the navigation image NP transmitted from the mobile device 3 on the display 24 (step S26).

Further, even in the case where the transmission device which transmits the image information to the image receiving unit 22 is determined to be a mobile device with which communication is newly established (Yes at step S16), the processing moves to step S26 and the navigation image NP received by the image receiving unit 22 is also displayed on the display 24. This means that in that case, as the image information (for example, navigation image NP) on which the travel regulation processing is performed is received by the image receiving unit 22, the image information is allowed to be displayed on the display 24.

As described above, the on-vehicle device 2 of the second embodiment detects interruption of reception of the navigation image NP transmitted from the mobile device 3, and when image information is received again after detection of interruption, the on-vehicle device 2 detects an authentication image included in the image information. Thereby, it is possible to determine whether or not the transmission device which transmits the image information after detection of interruption is the transmission device with which communication has established before interruption of reception (particular mobile device). Then, if the transmission device is not the particular mobile device, as the on-vehicle device 2 does not display the image transmitted from the transmission device, it is possible to prevent images transmitted from a transmission device other than the particular mobile device from being displayed on the on-vehicle device 2. Further, as the authentication image detection unit 21e detects the authentication image included in the image information, the user does not need to perform reply operation as in the case of the first embodiment, whereby the operability of the on-vehicle device 2 is improved. Further, in the case of using image information as authentication information, the authentication information is easily included in a video signal of the navigation image NP transmitted via the communication cable 4, whereby it is possible to transmit the authentication information easily from the mobile device 3 to the on-vehicle device 2.

3. Third Embodiment 3-1. Outline

Hereinafter, a third embodiment will be described. The display system 10 according to the third embodiment includes the same configuration and processing as those of the display system 10 of the first embodiment. As such, description will be given below focusing on the differences from the first embodiment.

In the first embodiment, interruption of reception of a navigation image NP transmitted from the mobile device 3 with which communication has been established is detected, and after detection of such interruption, communication with a transmission device is established again through second authentication, whereby it is determined whether or not the transmission device which transmits image information after detection of interruption is the mobile device (particular mobile device) with which communication was established before interruption of reception.

Meanwhile, in the third embodiment, interruption of reception of the navigation image NP transmitted from the mobile device 3 with which communication has been established is detected, and if image information is received again after detection of interruption, the on-vehicle device 2 detects an authentication command included in a signal received via the communication cable used for transmitting the image information. Thereby, it is determined whether or not the transmission device which transmits the image information after detection of interruption is the transmission device with which communication has been established before interruption of reception (particular mobile device). Thereby, it is possible to accurately determine whether or not the transmission device which transmits the image information, received again, is the particular mobile device. Further, as the authentication image detection unit 21e detects the authentication command included in the signal received via the communication cable, the user does not need to perform reply operation as in the case of the first embodiment, whereby operability of the on-vehicle device 2 is improved.

3-2. Configuration

Figure 10:
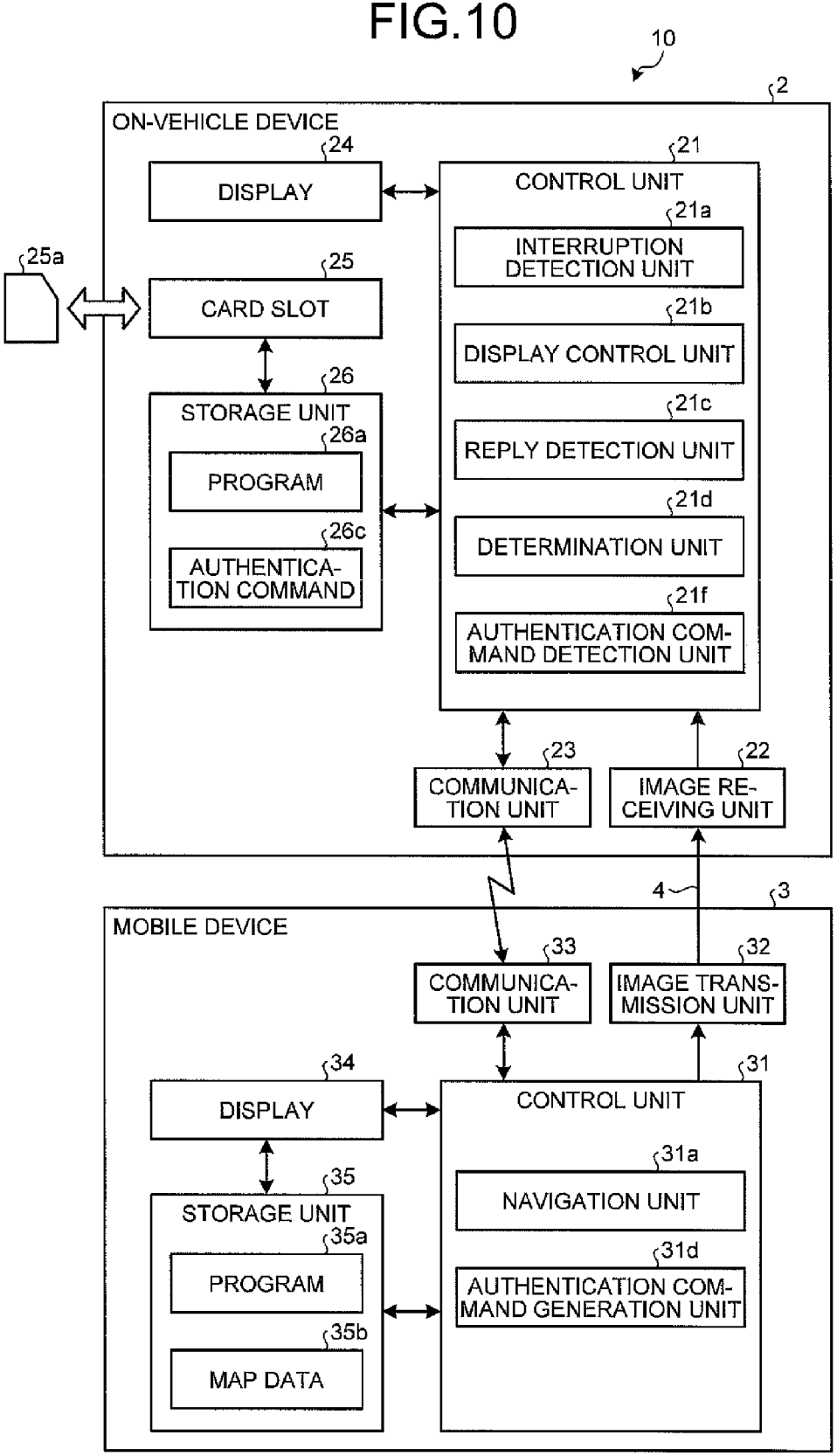
FIG. 10 is a block diagram illustrating a configuration of a system according to a third embodiment.

FIG. 10 is a block diagram illustrating a configuration of the display system 10 of the third embodiment. Differences from the first embodiment are that the control unit 21 of the on-vehicle device 2 includes an authentication command detection unit 21f, that the storage unit 26 stores an authentication command 26c, and that the control unit 31 of the mobile device 3 includes an authentication command generation unit 31d. Further, conditions based on which the determination unit 21d performs determination are also different. Other configurations are configured and work in the same manner as those of the first embodiment.

The authentication command detection unit 21f detects whether or not the authentication command included in the signal transmitted from the mobile device 3 via the communication cable 4 is a predetermined authentication command. This means that the authentication command detection unit 21f refers to the authentication command 26c, described in detail below, stored in the storage unit 26, and detects whether or not the authentication command transmitted from the mobile device 3 matches the authentication command 26c stored in the storage unit 26.

The authentication command 26c is a command code identifiable by a computer, for example, and is included in a control signal transmitted and received between the on-vehicle device 2 and the mobile device 3 via the communication cable 4. In particular, if an HDMI cable is used as the communication cable 4, the authentication command 26c is introduced in the extension region of a control signal transmitted and received using a CEC (Consumer Electronics Control) function of HDMI. It should be noted that if the communication cable 4 is configured of a set of communication lines, a communication line for transmitting and receiving image information and a communication line for transmitting and receiving a control signal including an authentication command are not necessarily the same. However, the communication cable 4 is preferably single cable, in order not to increase the number of connectors for connecting the communication cable 4.

The authentication command generation unit 31d generates a predetermined authentication command that the authentication command detection unit 21f should detect. The authentication command generated by the authentication command generation unit 31d is included in a signal transmitted via the communication cable 4, and is transmitted to the on-vehicle device 2 by the image transmission unit 32. It should be noted that the authentication command generated by the authentication command generation unit 31d is the same as the authentication command 26c stored in the storage unit 26 in advance.

When the image receiving unit 22 receives image information again after detection of interruption of image information by the interruption detection unit 21a, for example, if the authentication command transmitted to the authentication command detection unit 21f by the mobile device 3 matches the authentication command 26c stored in the storage unit 26, the determination unit 21d determines that the transmission device which transmits the image information is the mobile device 3 (particular mobile device) with which communication has been established before detection of interruption.

3-3. Processing Procedure

Figure 11:
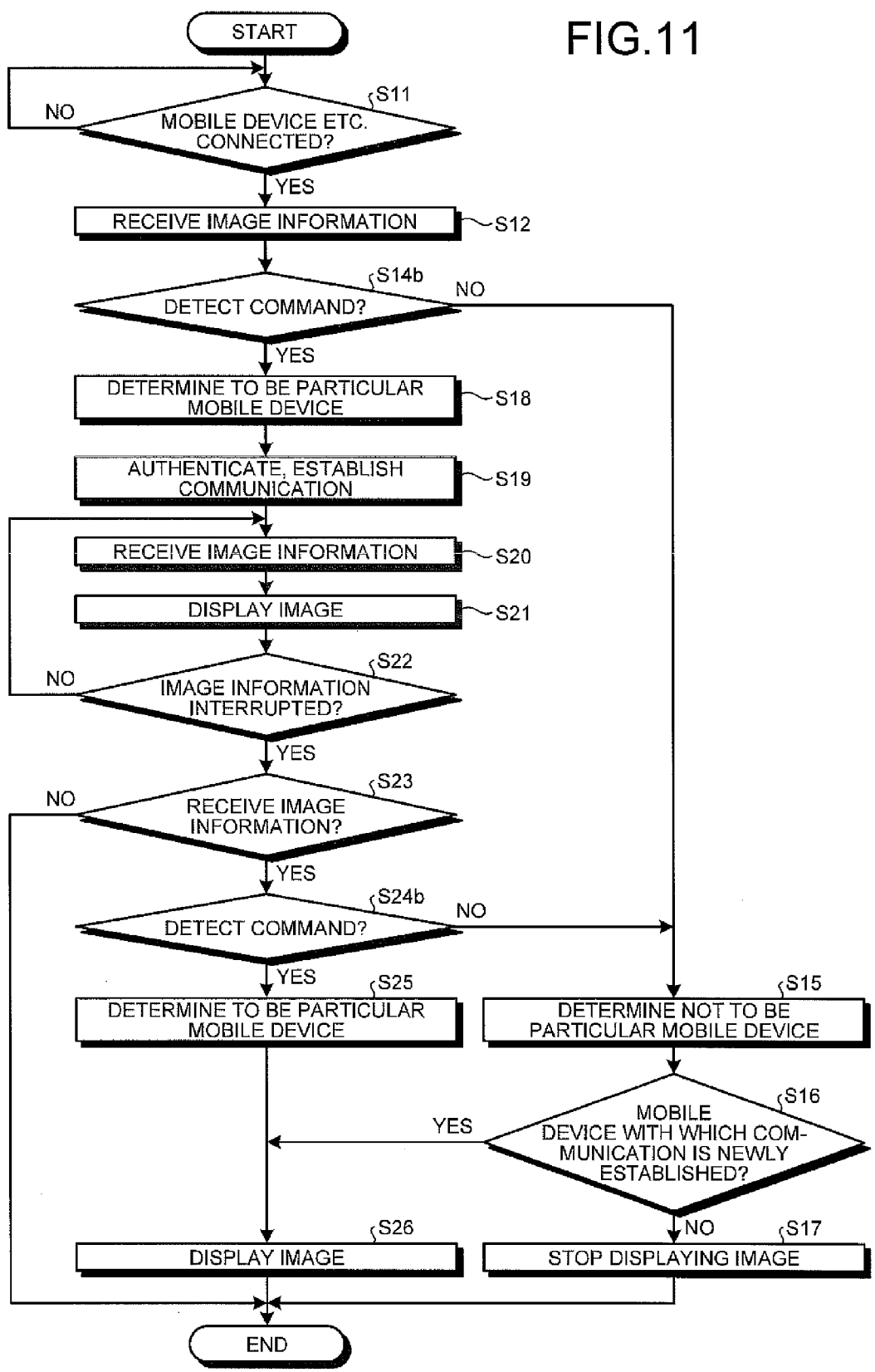
FIG. 11 is a flowchart illustrating a processing procedure of an on-vehicle device according to the third embodiment.

FIG. 11 is a flowchart illustrating the processing procedure of the on-vehicle device 2 of the third embodiment. It should be noted that in FIG. 11, the same processing as that of the previous embodiments is denoted by the same step number, and the description thereof is not given.

When a mobile device or the like is connected (Yes at step S11) and the image receiving unit 22 receives image information (step S12), the authentication command detection unit 21f determines whether or not an authentication command, included in a signal transmitted from the mobile device 3 via the same communication cable as that of the image information, is detected (step S14b). At step S14b, the authentication command detection unit 21f refers to the authentication command 26c stored in the storage unit 26, and detects whether or not the authentication command transmitted from the mobile device or the like matches the authentication command 26c stored in the storage unit 26.

When the authentication command 26c and the authentication command transmitted from the mobile device or the like do not match with each other, that is, when the authentication command detection unit 21f does not detect the authentication command 26c (No at step S14b), the determination unit 21d determines that the transmission device which transmits the image information is not the particular mobile device (step S15). Then, if, in the determination unit 21d, it is determined that the transmission device which transmits the image information received by the image receiving unit 22 is not a mobile device with which communication is newly established (No at step S16), displaying of the image transmitted from the transmission device on the display 24 of the on-vehicle device 2 is stopped (step S17).

On the other hand, if the authentication command transmitted from the mobile device or the like matches the authentication command 26c, that is, if the authentication command is detected (Yes at step S14b), it is determined that the transmission device which transmits the image information is the particular mobile device (step S18), and then processing from step S19 to step S23 is performed. After reception of the image information from the mobile device 3 is interrupted, when the image receiving unit 22 receives image information again (Yes at step S23), the authentication command detection unit 21f determines whether or not the authentication command 26c is detected, as in the case of S14b described above (step S24b).

If the authentication command does not match the authentication command 26c, that is, if the authentication command is not detected (No at step S24b), the determination unit 21d determines that the transmission device which transmits the image information to the image receiving unit 22 is not the mobile device with which communication has been established before interruption of reception is detected, that is, particular mobile device (step S15). Then, if the transmission device which transmits the image information, received by the image receiving unit 22 after detection of interruption of reception, is not a mobile device with which communication is newly established (No at step S16), displaying of the image transmitted from transmission device, which transmits the image information after interruption of the image information is detected, on the display 24 is stopped (step S17). In that case, there is a possibility that the device connected with the communication cable 4 is replaced and that image information not relevant to driving of the vehicle is transmitted from an image reproduction device other than the mobile device 3 to the on-vehicle device 2. Thereby, it is possible to prevent images transmitted from a transmission device other than the particular mobile device and images on which the above-mentioned travel regulation processing is not performed, from being displayed. Further, after completion of this processing, the on-vehicle device 2 does not perform communication with and receive images from other devices until execution of initial processing is operated again by the user.

On the other hand, if the authentication command detection unit 21f detects an authentication command (Yes at step S24b), the determination unit 21d determines that the transmission device which transmits the image information to the image receiving unit 22 is the mobile device with which communication has been established before interruption of reception is detected, that is, the particular mobile device (step S25).

It should be noted that even in the present embodiment, if the determination unit 21d determines that it is the particular mobile device at step S25, the on-vehicle device 2 does not perform authentication processing for establishing communication with the mobile device 3 again, that is, does not perform processing of S19 again, which is different from the first embodiment. This is because by keeping establishment of communication between the communication unit 23 of the on-vehicle device 2 and the communication unit 33 of the mobile device 3 at all time, release and reestablishment of communication performed in the first embodiment are omitted, to thereby make the processing procedure efficient and improve the communication speed.

Accordingly, when the determination unit 21d determines that the transmission device which transmits the image information to the image receiving unit 22 is the particular mobile device, the display control unit 21b immediately displays the navigation image NP transmitted from the mobile device 3 on the display 24 (step S26).

It should be noted that if it is determined that the transmission device which transmits the image information to the image receiving unit 22 is the mobile device 3 with which communication is newly established (Yes at step S16), the processing moves to step S26 and the navigation image NP received by the image receiving unit 22 is also displayed on the display 24. This is the same as in the second embodiment.

As described above, the on-vehicle device 2 of the third embodiment detects interruption of reception of the navigation image NP transmitted from the mobile device 3 with which communication has been established, and if image information is received again after detection of interruption, the on-vehicle device 2 detects an authentication command included in a signal transmitted via the communication cable 4 used for transmitting the image information. Thereby, it is possible to determine whether or not the transmission device which transmits the image information after detection of interruption is the transmission device with which communication has been established before interruption of reception. Then, if the transmission device is not the particular mobile device, as the on-vehicle device 2 does not display the image transmitted from the transmission device, it is possible to prevent images transmitted from a transmission device other than the particular mobile device from being displayed on the on-vehicle device 2. Further, as the authentication image detection unit 21e detects an authentication command included in a signal transmitted via the communication cable 4, the user does not need to perform reply operation as in the case of the first embodiment, whereby the operability of the on-vehicle device 2 is improved. Further, in the case of using an authentication command as authentication information, the authentication information can be included in a signal transmitted via the communication cable 4 separately from the image information, whereby it is possible to transmit the authentication information easily from the mobile device 3 to the on-vehicle device 2, without affecting the image information. In particular, if an HDMI cable is used as the communication cable 4, it can be introduced in the extension region of the CEC function of HDMI, whereby the authentication information can be transmitted easily.

4. Modified Example

The present invention is not limited to the embodiments described above, and can be modified in various manners. Hereinafter, such modified examples will be described. All modes including the embodiments described above and the modes described below can be combined as appropriate.

In the embodiments described above, the on-vehicle device 2 and the mobile device 3 are connected with each other via the communication cable 4, and transmit and receive data signals and image information by wired communication. Meanwhile, image information may be transmitted and received between the on-vehicle device 2 and the mobile device 3 by wireless communication.

Further, while it has been described that image information transmitted from the mobile device 3 to the on-vehicle device 2 is a navigation image NP, it is not necessarily a navigation image NP. It may be an image showing traffic information or weather forecast. However, images to be used for driving of the vehicle 1 by the user are desirable.

Further, in the embodiments described above, while it has been described that various types of functions are realized by means of software by arithmetic processing of a CPU in accordance with a program, part of those functions may be realized by an electrical hardware circuit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

REFERENCE SIGNS LIST 1 vehicle
2 on-vehicle device
3 mobile device
4 communication cable
5 image reproduction device
10 display system

The invention claimed is:

1. An on-vehicle device for use with a display device, the on-vehicle device being capable of communicating with a mobile device, the on-vehicle device comprising:
   a memory;
   a processor coupled to the memory, the processor being programmed to execute:
   (a) receiving first image information transmitted from a particular mobile device that communicates with the on-vehicle device;
   (b) detecting an interruption of the reception of the first image information from the particular mobile device;
   (c) determining, when second image information is received after interruption of the reception of the first image information is detected, whether or not a transmission device that transmits the second image information corresponds to the particular mobile device; and
   (d) stopping a display of the second image information on the display device when the transmission device is determined not to correspond to the particular mobile device, wherein:
   the determination (c) determines that, when the second image information is received within a predetermined time, the transmission device transmitting the second image information corresponds to the particular mobile device.

2. The on-vehicle device according to claim 1, wherein
the determination (c) includes determining whether the transmission device, which transmits the second image information received by the reception unit after the interruption of the reception of the first image information is detected, is a mobile device with which communication is newly established, and when it is determined that the transmission device is neither the mobile device with which communication is newly established nor the particular mobile device, the display device stops displaying the second image information transmitted from the transmission device.

3. The on-vehicle device according to claim 1, further comprising:
detecting a reply from a user, wherein
the second image information includes notice information that should be notified to the user, and
when a reply from the user with respect to the notice information displayed on the display device is detected, the transmission device is determined as corresponding to the particular mobile device.

4. The on-vehicle device according to claim 1, further comprising:
detecting authentication information included in the second image information, wherein
when the authentication information of the second image information transmitted from the transmission device is detected, the transmission device is determined as corresponding to the particular mobile device.

5. The on-vehicle device according to claim 1, further comprising:
detecting a particular authentication command, wherein
when the authentication command is detected from a signal transmitted from the transmission device, the transmission device is determined as corresponding to the particular mobile device.

6. The on-vehicle device according to claim 2, further comprising
detecting a reply from a user, wherein
the second image information includes notice information that should be notified to the user, and
when a reply from the user with respect to the notice information displayed on the display device is detected, the transmission device is determined as corresponding to the particular mobile device.

7. The on-vehicle device according to claim 2, further comprising:
detecting authentication information included in the second image information, wherein
when the authentication information of the second image information transmitted from the transmission device is detected, the transmission device is determined as corresponding to the particular mobile device.

8. The on-vehicle device according to claim 2, further comprising:
detecting a particular authentication command, wherein
when the authentication command is detected from a signal transmitted from the transmission device, the transmission device is determined as corresponding to the particular mobile device.

9. The on-vehicle device according to claim 1, wherein the interruption of the reception of the first image information is detected through detecting that a communication cable, which connects the on-vehicle device to the mobile device, is released.

10. A communication method of an on-vehicle device for use with a display device, the on-vehicle device being capable of communicating with a mobile device, the communication method comprising:

(a) receiving first image information transmitted from a particular mobile device that communicates with the on-vehicle device;

(b) detecting an interruption of the reception of the first image information transmitted from the particular mobile device;

(c) determining, when second image information is received after interruption of the reception of the first image information is detected, whether or not a transmission device that transmits the second image information corresponds to the particular mobile device; and (d) stopping a display of the second image information on the display device when the transmission device is determined not to correspond to the particular mobile device, wherein:

the determination (c) determines that, when the second image information is received within a predetermined time, the transmission device transmitting the second image information corresponds to the particular mobile device.

11. A non-transitory computer readable storage medium having stored therein a program executable by a computer included in an on-vehicle device for use with a display device, the on-vehicle device being capable of communicating with a mobile device, the program causing the computer to execute a process comprising:

(a) receiving first image information transmitted from a particular mobile device that communicates with the on-vehicle device;

(b) detecting an interruption of the reception of the first image information transmitted from the particular mobile device;

(c) determining, when second image information is received after interruption of the reception of the first image information is detected, whether or not a transmission device that transmits the second image information corresponds to the particular mobile device; and (d) stopping a display of the second image information on the display device when the transmission device is determined not to correspond to the particular mobile device, wherein:

the determination (c) determines that, when the second image information is received within a predetermined time, the transmission device transmitting the second image information corresponds to the particular mobile device.

* * * * *